3,060,036
POULTRY FREEZING AND PACKAGING
Delos Balbach Van Dolah, Chicago, Ill., assignor to Swift & Company, Chicago, Ill., a corporation of Illinois
No Drawing. Filed Mar. 11, 1959, Ser. No. 798,596
5 Claims. (Cl. 99—194)

This invention relates to the processing of poultry and more specifically, to a method for preparing packages of frozen dismembered poultry.

Due to its heterogeneous composition and unsymmetrical configuration, cut up poultry exhibits considerable distortion and uneven expansion when frozen. Such uneven expansion causes deformation of the flexible cartons in which poultry is ordinarily packaged. In the past this difficulty has been obviated by compressing or confining the packages while they are being frozen.

Various methods for shaping thermally expandable food products have been suggested by the prior art. One of the more popular methods is one which involves compressing the packages of poultry between freezing plates that serve to conduct heat away from the poultry and at the same time mold the package. The latter method has shortcomings in that the exertion of mechanical pressure on the unfrozen poultry at the beginning of the cycle tends to squeeze moisture from the poultry, thus creating a drier product and causing the formation of free ice crystals within the package. Another disadvantage inherent in a plate freezing process is that in order to make the process economically feasible large batches of packages of unfrozen poultry must be accumulated and subjected to the pressure plates at one time. During the period required to accumulate these batches, undesirable dehydration of the product occurs through moisture loss to the atmosphere. This moisture loss obviously results in a decrease in final product yield.

It is therefore an object of this invention to provide a method of producing packages of frozen dismembered frozen poultry which have uniform dimensions.

It is another object of this invention to provide a method of preparing packages of frozen poultry, the interiors of which are substantially free from free ice crystals.

It is still another object of this invention to provide a continuous method of freezing and molding poultry in which excessive moisture loss from the product is prevented.

Various other possible objects of the invention will become apparent to those skilled in the art from the following detailed description.

Generally, the preferred method of practicing the present invention involves partially freezing dismembered poultry after it has been cartoned, compressing the partially frozen package to remove the bulges which occur due to the expansion of the poultry during the partial freezing, and finally removing the package from compression and placing it in a storage freezer to complete freezing. While the preferred method has been described in connection with the processing of a packaged unfrozen poultry mass it is understood that individual pieces or masses of poultry could be partially frozen before being placed in the package and the bulges removed therefrom in the packaged state.

More particularly, the invention contemplates a continuous method of producing packages of frozen poultry which are of uniform dimension and are free from ice crystals within. The first and most critical step of the method comprises the rapid crust freezing of primal parts of poultry which have been placed within a flexible carton. This rapid crust freezing is preferably carried out at a quick freezing temperature of approximately −30° to −40° F. Higher or lower quick freezing temperature may be used with a corresponding increase or decrease in time required to achieve the desired result. In this embodiment of the invention no mechanical pressure is applied to the package during the initial freezing step, and that the package is subjected to the quick-freeze temperature only until the carton begins to bulge due to the expansion of the poultry within. The frozen crust developed during the initial freezing step should be of sufficient thickness so that the package may acquire a permanent set when compressed but not so thick that it is impossible to remove the bulges acquired by the carton. The time required for a satisfactory crust to form is dependent upon the initial temperature of the poultry, the size of the poultry mass, and the type of heat exchange apparatus used, as well as the freezing temperature maintained therein. For example, if a blast freezer is employed, a crust of satisfactory thickness may be formed on a one pound package in as little as 45 minutes; on the other hand, if a quiescent type freezer is used, a considerably longer period may be required. By continuously crust freezing the poultry immediately after packaging, excessive dehydration of the product is minimized.

After a satisfactory frozen crust has been formed on the product and while the inner portions of the poultry remain unfrozen and plastic, the package is removed from the quick freezing zone. The crust-frozen product is then subjected to the second step of the process which consists of applying mechanical pressure to at least two, and preferably all sides of the package. The package is pressed in a manner that will remove any irregularities or unevenness, i.e. bulge, which occurs in the carton due to the uneven thermal expansion of the poultry within. The pressure is exerted with sufficient force and for sufficient duration to mold the package to a predetermined desired size and contour. When the forming pressure is exerted after the crust freezing step, the frozen crust prevents internal moisture from being lost from the product thus obviating a decreased yield and the formation of ice crystals within the package.

The packages brought to the desired size and contour by the pressing operation are stored in a freezer maintained at freezing temperatures such as about 0° F. to about −10° F. or lower. The freezing of the interior portions of the poultry occurs in the storage freezer, where the poultry may remain until it is consumed.

It has been found that the packages undergo no further deformation while the freezing is being completed at storage temperatures. This is apparently due to the fact that the greatest amount of expansion occurs during the initial crust freezing step while the poultry pieces are packed loosely in the package. After the pieces are crust frozen, they are capable of being compacted. Subsequently, after the pressing operation, the mass of loosely packed pieces becomes a relatively homogeneous mass which responds to further thermal treatment with a considerable degree of uniformity.

EXAMPLES

The following specific examples represent embodiments of the invention:

*Example I*

One pound cartons of poultry parts were subjected to the action of a blast freezer for a period of 45 minutes. The initial temperature of the poultry was about 60° F., and the freezer blast was maintained at a temperature of −40° F. After 45 minutes of blast freezing, the crust frozen cartons had developed several bulges. These bulges were removed by compressing the packages on all sides with a conventional platen type press. The packages were then placed in a storage freezer and maintained at a temperature of −5° F.

Example II

Two pound portions of cut-up poultry were subjected to the action of a −40° F. blast freezer for a period of 60 minutes. The poultry was then packaged and any unevenness in the packages was removed by compression. The packages were placed in a storage freezer and maintained at a temperature of −5° F.

The cartons processed in the above manner did not develop any further bulges in the storage freezers. The product within the carton was substantially free from ice crystals and did not undergo any weight loss from the time it was placed in the cartons until it was consumed.

It was found that if the crust freezing period given in the above examples was increased for a period of more than about 30 minutes at −40° F., the packages were frozen too solid to be conveniently pressed to shape. On the other hand, if the crust freezing period was reduced by about 15 minutes at the same temperature, the package would not retain its given set in the storage freezer. In general, a satisfactory frozen crust would be that crust which is sufficiently thick to retain a given set but not so thick so as to be impossible to mold with reasonable pressure. It is pointed out that the exact time for such a crust to form is dependent on a great number of variables such as the initial temperature of the poultry, the size and texture of the poultry mass; the configuration of the carton, the type of freezer and, blast freezing temperature used, and so forth. Thus it can be seen the determination of exact crust freezing periods for a given set of variables is strictly an empirical matter, and the freezing periods given in the cited examples are merely representative and not meant to be limiting.

The invention has been described above in connection with the packaging of cut-up poultry, but it should be understood the principles of the invention could be applied to whole or partially cut up chickens, turkeys, etc., as well as various cuts of meat where bulging of the package occurs on freezing. Also, the invention is not restricted to packaging in cartons, but may be useful in packaging with other materials, whether flexible or semi-rigid.

Obviously many modifications and variations of the invention as hereinbefore set forth may be made without departing from the spirit and scope thereof, and therefore only such limitations should be imposed as are indicated in the appended claims.

I claim:
1. In a method of processing meat products the improvement comprising: subjecting meat products to quick-freezing temperatures whereby crust-frozen meat products are formed, the inner portions of which remain unfrozen and plastic; molding said crust-frozen meat products by compression; and completing the freezing of said meat products.

2. In a method of processing packaged cuts of meats which comprises: subjecting packaged cuts of meat to quick-freezing temperatures whereby said packaged meat products are crust-frozen, the inner portions of which remain unfrozen and plastic; molding said crust-frozen packaged meat products by compression; and completing the freezing of said crust-frozen packaged meat products.

3. In a method of processing poultry products the improvement comprising: subjecting poultry products to quick-freeze temperatures whereby crust-frozen products are formed, the inner portions of which remain unfrozen and plastic; packaging said crust-frozen poultry; molding said poultry products by compression; and completing the freezing of said poultry products.

4. In a method of processing cut-up packaged poultry products the improvement comprising: subjecting packaged cut-up poultry products to quick-freeze temperatures whereby crust-frozen products are formed, the inner portions of which remain unfrozen and plastic; molding said products by compression; and completing the freezing of said poultry products.

5. A method of processing dressed poultry which comprises: subjecting cut-up poultry to a quick-freezing temperature of from about −30° F. to about −40° F. for a period of from about 45 minutes to about 60 minutes for purpose of forming a frozen crust thereon; packaging said crust-frozen poultry; molding said packaged poultry by compression; removing the poultry from said compression; and completing the freezing of said poultry.

References Cited in the file of this patent

UNITED STATES PATENTS

| | | |
|---|---|---|
| 1,773,080 | Birdseye | Aug. 12, 1930 |
| 1,943,019 | Henney et al. | Jan. 9, 1934 |
| 1,983,768 | Norton | Dec. 11, 1934 |
| 2,020,843 | Lohner | Nov. 12, 1935 |
| 2,267,789 | Conn | Dec. 30, 1941 |
| 2,825,652 | Berkowitz | Mar. 4, 1958 |